United States Patent
Vandiver et al.

(10) Patent No.: US 11,042,516 B2
(45) Date of Patent: Jun. 22, 2021

(54) FLEXIBLE SCHEMA TABLE

(71) Applicant: HEWLETT PACKARD ENTERPRISE DEVELOPMENT LP, Houston, TX (US)

(72) Inventors: Benjamin M Vandiver, Cambridge, MA (US); Lyric Pankaj Doshi, Cambridge, MA (US); James George Fraumeni, Cambridge, MA (US)

(73) Assignee: MICRO FOCUS LLC, Santa Clara, CA (US)

( * ) Notice: Subject to any disclaimer, the term of this patent is extended or adjusted under 35 U.S.C. 154(b) by 1148 days.

(21) Appl. No.: 15/033,512

(22) PCT Filed: Dec. 6, 2013

(86) PCT No.: PCT/US2013/073693
§ 371 (c)(1),
(2) Date: Apr. 29, 2016

(87) PCT Pub. No.: WO2015/084408
PCT Pub. Date: Jun. 11, 2015

(65) Prior Publication Data
US 2016/0283527 A1    Sep. 29, 2016

(51) Int. Cl.
*G06F 16/21*  (2019.01)
*G06F 16/22*  (2019.01)
*G06F 16/2455*  (2019.01)
*G06F 16/2453*  (2019.01)
*H04L 29/06*  (2006.01)

(52) U.S. Cl.
CPC ........ *G06F 16/213* (2019.01); *G06F 16/2282* (2019.01); *G06F 16/2454* (2019.01); *G06F 16/2455* (2019.01); *H04L 63/20* (2013.01)

(58) Field of Classification Search
CPC .............. G06F 16/213; G06F 16/2454; G06F 16/2282; G06F 16/2455; H04L 63/20
See application file for complete search history.

(56) References Cited

U.S. PATENT DOCUMENTS

| | | | |
|---|---|---|---|
| 7,243,097 B1 * | 7/2007 | Agrawal | G06F 21/6227 |
| 8,239,423 B2 * | 8/2012 | Gitai | G06F 16/211 707/803 |
| 8,244,694 B2 | 8/2012 | Petri et al. | |

(Continued)

FOREIGN PATENT DOCUMENTS

EP    1383056    1/2004

OTHER PUBLICATIONS

International Searching Authority, "Notification of Transmittal, of the International Search Report and the Written Opinion", PCT/US2013/073693, dated Sep. 4, 2014, 9 pages.

(Continued)

*Primary Examiner* — Mark D Featherstone
*Assistant Examiner* — Faezeh Forouharnejad (57) ABSTRACT

In an example, a flexible schema table may be schematized. Records from the flexible schema table may be queried and, for keys in the records, a data type is estimated for each key. View columns may then be selected from the keys based on a predetermined condition. A view of the flexible schema table may be created from the selected view columns, wherein the view includes the view columns and the data types for the view columns.

16 Claims, 5 Drawing Sheets

(56) References Cited

U.S. PATENT DOCUMENTS

| | | | | |
|---|---|---|---|---|
| 8,429,143 | B2 * | 4/2013 | Ellison | G06F 16/9014 |
| | | | | 707/698 |
| 8,484,259 | B1 | 7/2013 | Makkar et al. | |
| 2005/0234894 | A1 * | 10/2005 | Tenazas | G06Q 40/04 |
| 2006/0117057 | A1 | 6/2006 | Legault et al. | |
| 2007/0061544 | A1 * | 3/2007 | Uppala | G06F 16/221 |
| | | | | 711/173 |
| 2007/0282804 | A1 * | 12/2007 | Bowman | G06F 16/245 |
| 2008/0172354 | A1 * | 7/2008 | Zuzarte | G06F 16/24545 |
| 2009/0144235 | A1 * | 6/2009 | Bhide | G06F 16/2282 |
| 2011/0191303 | A1 * | 8/2011 | Kaufman | G06F 7/00 |
| | | | | 707/684 |
| 2013/0124545 | A1 | 5/2013 | Holmberg et al. | |
| 2013/0254171 | A1 | 9/2013 | Grondin et al. | |
| 2014/0304263 | A1 * | 10/2014 | Vaitheeswaran | G06F 16/285 |
| | | | | 707/737 |
| 2015/0088924 | A1 * | 3/2015 | Abadi | G06F 16/90335 |
| | | | | 707/769 |

OTHER PUBLICATIONS

Nuno Santos et al., Metadata Services on the Grid, (Research Paper), Sep. 13, 2005, 5 Pages.

Srini Acharya et al., Relational Support for Flexible Schema Scenarios, (Research Paper) Oct. 8, 2008, 12 Pages.

Kathleen Fisher, et al., "The PADS Project: An Overview", International Conference on Database Theory, Mar. 2011, 7 pages.

Mike Cafarella, "RecordBreaker: Automatic structure for your text-formatted data" posted online on Nov. 27, 2011, 8 pages. https://web.archive.org/web/20111127224438/http://cloudera.github.com/RecordBreaker/>.

* cited by examiner

| KEYS TABLE 210 | | |
|---|---|---|
| Key Name 220 | Frequency 230 | Data Type Estimate 240 |
| Contributors | 146429 | varchar (20) |
| Entities.hashtags | 146429 | long varbinary (2800) |
| Coordinates | 144343 | varchar (20) |
| Geo | 144343 | varchar (2) |
| Place | 143787 | varchar (20) |
| User.profile_banner_url | 62023 | varchar (128) |
| Retweeted_status.contributors | 32996 | long varbinary (68) |

| LIST OF VIEW FIELDS 310 | | | | |
|---|---|---|---|---|
| Schema 320 | View 330 | Column 340 | Type 350 | Size 360 |
| Public | Tweets_view | Contributors | varchar (20) | 20 |
| Public | Tweets_view | Entities.hastags | long varbinary (2800) | 2800 |
| Public | Tweets_view | Coordinates | varchar (20) | 20 |
| Public | Tweets_view | Geo | varchar (20) | 20 |
| Public | Tweets_view | Place | varchar (20) | 20 |
| Public | Tweets_view | User.profile_banner_url | varchar (128) | 128 |
| Public | Tweets_view | Retweeted_status.contributors | long varbinary (68) | 68 |

FLEXIBLE SCHEMA TABLE

BACKGROUND

A relational database schema is the structure of a database system as described in a formal language supported by a database management system (DBMS). In a relational database, the schema defines the elements within the database and their interrelationships. This includes tables, fields, views, and etc. Relational databases perform searches where data stored in the databases is organized in fixed and consistent formats across all records. As such, before loading a new type of data into a database, an administrator defines the fields and data types and sizes so that the database can fit the newly added data into the existing fixed and consistent format.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Relational databases perform searches where data is organized in fixed and consistent formats across all records. While this fixed schema can be changed to include additional fields (i.e., columns), such an action is driven by an administrator. As such, the process of loading a new type of data into the database involves the administrator executing a schema definition task before the data is loaded. The administrator executing the schema definition task must be knowledgeable enough about the data to accurately define the fields and data types and sizes, so that the database can fit the newly added data into its existing fixed and consistent format.

Once the data is loaded, a query language like Structured Query Language (SQL) is adequate for expressing the analysis to be performed. The schema definition task, however, can be a barrier to entering data into relational databases. For instance, the user may not be knowledgeable enough about the new data to formulate a fixed schema.

A flexible schema table uses a flexible schema instead of a fixed schema. A flexible schema allows the available fields of a table to be determined by the data loaded into the table rather than by the administrator upfront, i.e., prior to loading the data into the table. While this functionality makes data load simple, it imposes a burden during querying due to the lack of a fixed schema. For instance, in flexible schema tables, records may be inconsistent due to changes in the content of a record or due to multiple record types being present in a single stream of data. Records may be lacking fields, or newer versions of the data source may supply additional fields. Moreover, multiple different record types may arrive on the same stream. Such new data does not fit neatly within the format of a fixed schema of the relational database to optimize queries. A Flexible schema table decomposes each record into a set of key-value pairs. The set of key-value pairs may vary between records. At query time, referencing a "column" of the flexible table is converted to looking up the key of the same name in each record. If a particular record lacks a specified key, the SQL NULL value is returned. For this disclosure, a "key" refers to the underlying key-value map of the flexible table, whereas a "column" refers to the SQL mechanism of querying the table.

Disclosed herein are examples of methods and a system to schematize a flexible schema table to create a view of the underlying flexible schema table, wherein the view has an appearance of a fixed schema table. Schematization may include identifying the keys and the data type of each key for a flexible schema table, selecting view columns from the keys based on a predetermined condition, and creating a view of the flexible schema table that includes the selected view columns and the data type for each of the view columns. A flexible schema table for example is a dynamic table that allows its available fields to be determined by the data loaded into the table rather than by the administrator prior to loading the data into the table. The keys for example are columns in the flexible schema table. View columns are the keys selected for the view. A view is arranges the records of a table in some order and makes only certain fields visible without affecting the physical organization of a database.

Also disclosed herein are a system for implementing the methods and a non-transitory computer readable medium on which is stored machine readable instructions that implement the methods. Methods for the schematization of the flexible schema table may be implemented or invoked in a Vertica™ column-stored database or other types of databases.

According to an example, metadata for a flexible schema table may be discovered by querying the records of the flexible schema table to identify keys for the records and estimate a data type for each of the keys. Other database tools and processes rely on metadata, which are defined by an administrator upfront in fixed schema tables, to perform queries on tables. Flexible schema tables, however, intentionally may not store this information upfront because the fields are determined dynamically by the loaded data. An example of the present disclosure may automatically discover the metadata for the flexible schema table and create a view based on the discovered metadata, which may include the keys in the records and an estimated data type for each of the keys. Other database tools and processes may then perform a query on the created view, which has the appearance of a fixed schema table with metadata. Accordingly, a query may be performed on the view by a database tool or process without discerning whether the underlying table is defined by a flexible schema or fixed schema.

According to another example, view columns may be selected from the keys of the records of the flexible schema table. The view columns and their estimated data types may be included as fields in a view that is created for the flexible schema table. Other database tools and processes typically rely on a queried table having a fixed set of fields to operate correctly and efficiently. For instance, the database tool or process may rely on the fact that a queried table has exactly four fields. If the queried table is subsequently loaded with a fifth field, this may cause an operating error for the database tool or process. Therefore, an example of the present disclosure may infer the fixed set of fields that is expected by the database tools or processes by selecting the appropriate view columns and including the appropriate view columns and their estimated data types as fields in a view created for the flexible schema table. By creating a view that has the appearance of a fixed schema table, the database tools and processes do not need to be changed to make use of the flexible schema table.

Furthermore, view columns may be selected from the keys of the records of the flexible schema table based on predetermined conditions other than the database schema constraints, as discussed above. The predetermined conditions for selection of view columns may be based on a frequency of occurrence of the keys in the flexible schema table, a usage of the keys in previous queries, a security policy, and a user annotation for the keys, etc. For instance, infrequent occurrence of a key in the flexible schema may indicate that the key has a typographical error and should not be presented as a field in the view created for the flexible schema table. Moreover, duplicate keys may not be selected for inclusion in the view based on a predetermined condition.

The schematization of a flexible schema table according to the disclosed examples enables other database tools and processes to take advantage of flexible schema tables without having to adapt their existing processes. A schema change can be disruptive and production deployments typically need to schedule these schema changes to avoid downtime. By using a schematization of flexible schema tables, however, the production deployment can regenerate the view at any time. Further, by using views, the existing load properties of the flexible schema tables are preserved. Additionally, the process can be repeated for different users where different table fields are important. In this manner, many entities can share a base flexible schema table, which simplifies deployment. The components of the required for the schematization of the present disclosure are readily available in databases, thus ensuring that integration of the flexible schema table with fixed schema tables is not overly complex.

Figure 1:
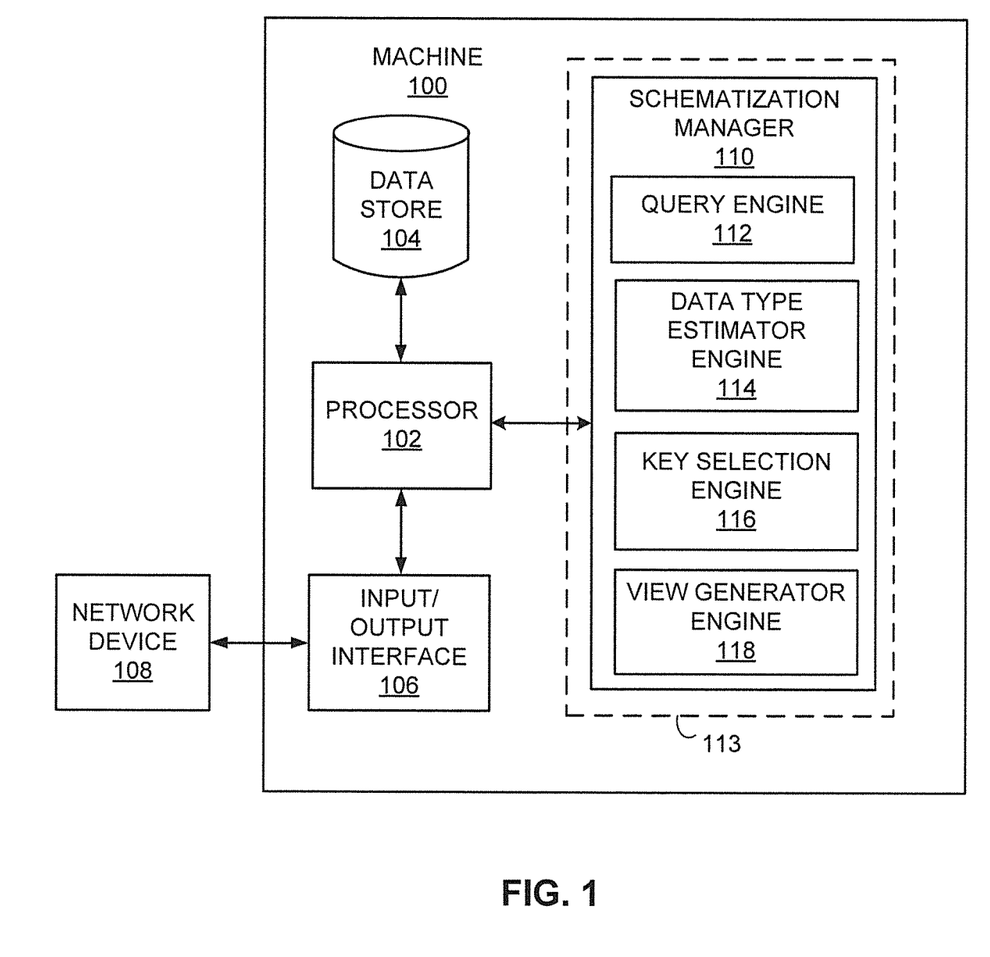
FIG. 1 shows a block diagram of a machine that may implement a schematization of a flexible schema table, according to an example of the present disclosure.

With reference to FIG. 1, there is shown a block diagram of a machine 100 that may implement a schematization for a flexible schema table according to an example of the present disclosure. It should be understood that the machine 100 may include additional components and that one or more of the components described herein may be removed and/or modified without departing from a scope of the machine 100.

The machine 100 is depicted as including a processor 102, a data store 104, an input/output interface 106, and a schematization manager 110. The machine 100 comprises a computer. In one example, the computer is a server but other types of computers may be used. Also, the components of the machine 100 are shown on a single computer as an example and in other examples the components may exist on multiple computers. The machine 100 may store a flexible schema table in the data store 104 and/or may manage the storage of data in a flexible schema table stored in a separate machine, for instance, through a network device 108, which may comprise, for instance, a router, a switch, a hub, etc. The data store 104 includes a storage device, such as hard disk, memory, etc.

The schematization manager 110 is depicted as including a query engine 112, a data type estimator engine 114, a key selection engine 116, and a view generator engine 118. The processor 102, which may comprise a microprocessor, a micro-controller, an application specific integrated circuit (ASIC), or the like, is to perform various processing functions in the machine 100. The processing functions may include the functions of the engines 112-118 of the schematization manager 110 as discussed in greater detail herein below.

In one example, the schematization manager 110 comprises machine readable instructions stored on a non-transitory computer readable medium 113 and executed by the processor 102. Examples of the non-transitory computer readable medium include dynamic random access memory (DRAM), electrically erasable programmable read-only memory (EEPROM), magnetoresistive random access memory (MRAM), Memristor, flash memory, hard drive, and the like. The computer readable medium 113 may be included in the data store 104 or may be a separate storage device. In another example, the schematization manager 110 comprises a hardware device, such as a circuit or multiple circuits arranged on a board. In this example, the engines 112-118 comprise circuit components or individual circuits, such as an embedded system or ASIC.

The input/output interface 106 comprises a hardware and/or a software interface. The input/output interface 106 may be a network interface connected to a network, such as the Internet, an intranet, etc., through the network device 108, over which the schematization manager 110 may receive and communicate information, for instance, the data contained in a flexible schema table. The processor 102 may store information received through the input/output interface 106 in the data store 104 and may use the information in implementing the engines 112-118. The data store 104 may include volatile and/or non-volatile data storage.

The engines 112-118 of the schematization manager 110 perform a schematization for a flexible schema table as described herein. The functions of the query engine 112, the data type estimator engine 114, the key selection engine 116, and the view generator engine 118 are discussed in greater detail with respect to FIGS. 2 and 3, as well as in methods 400 and 500 depicted in FIGS. 4 and 5.

Figure 2:
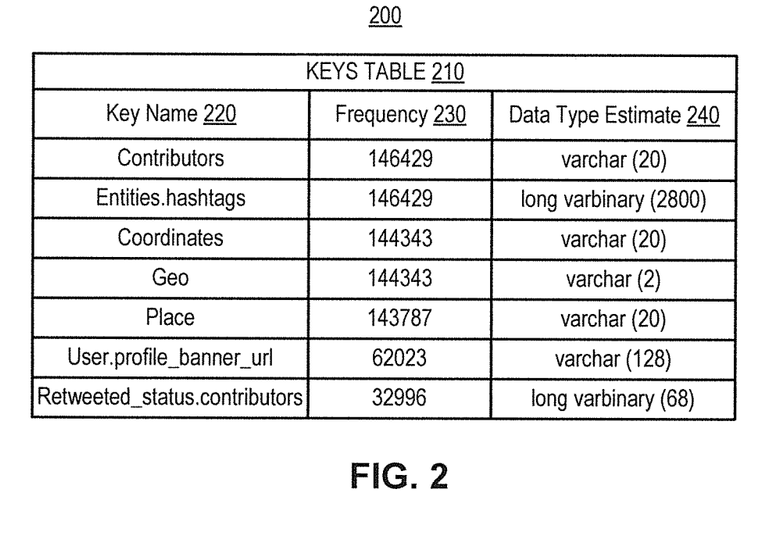
FIG. 2 shows a diagram of keys table for a flexible schema table, according to an example of the present disclosure.

With reference to FIG. 2, there is shown a diagram 200 of a keys table 210, according to an example of the present disclosure. It should be understood that the data depicted in FIG. 2 is for purposes of illustration only. In addition, the data depicted in FIG. 2 is used in various examples throughout the present disclosure to provide an understanding of the schematization of a flexible schema table.

As shown in FIG. 2, the keys table 210, for instance, may include fields for a key name 220, a frequency 230, and a data type estimate 240. According to an example, the query engine 112 may perform a query for each record in a flexible schema table to identify the keys of the flexible schema table. The query may, for instance, be a SQL query. Further, the records in the flexible schema table may include a plurality of key-value pairs. In any regard, the identified keys may be outputted to the keys table 210 under the key name field 220 according to the SQL query. For instance, the identified keys for Contributors, Entities.hashtags, Coordinates, Geo, Place, User.profile_banner_url, and Retweeted_status.contributors may be outputted to the keys table 210.

The query performed by the query engine 112 may also identify a frequency of occurrence for each of the identified keys in the flexible schema table. The frequency of occurrence for each of the identified keys in the flexible schema table may also be outputted to the keys table 210 under the frequency field 230 according to the query. For instance, after the data is loaded into the flexible schema table, the query engine 112 runs a query to identify the number of times "Contributors", which is a key in this example, appears. An example of the results shown in FIG. 2 indicates "Contributors" appears 146429 times in the flexible schema table. Examples of the frequency of occurrence are shown for different keys.

According to an example, the data type estimator engine 114 may estimate a data type for each of the identified keys in the flexible schema table. The data type estimator engine 114 may retrieve values associated with each of the identified keys and run an aggregate function in the query to identify a most specific data type capable of describing all of the values associated with each identified key. The data type estimate for all of the values associated with each identified key may be outputted to the keys table 210 under the data type estimate field 240 according to the query.

For instance, the data type estimator engine 114 may determine that all the values associated with the key for "Geo" are either a letter or number under the size of 2 for all 144343 occurrences of the key Geo. Accordingly, the data type estimator engine 114 may estimate that the data type for values associated with the key "Geo" is a variable character field (varchar) of size 2 according to this example. By way of example, one value associated with the key Geo may be the number '12' and another value associated with the key Geo may be the letter 'A'. Thus, the aggregate function may estimate that the data type of the values associated with the key Geo may encompass a letter or number and that the maximum size of the values associated with the key Geo may be as large as 2 characters.

Therefore, the keys table 210 depicted in FIG. 2 may include, but is not limited to, persisted output from a query that identifies the keys of the records in a flexible schema table (220), estimates a data type for values associated with each key (240), and determines a frequency of occurrence for the identified keys (230). The keys table 210 may include any other metrics regarding the identified keys that are outputted from a query of the flexible schema table as metadata. For example, since the keys table 210 is persistent, a user may annotate the keys table 210 to control which of the keys are included in a view that is created for the flexible schema table as discussed further below.

Figure 3:
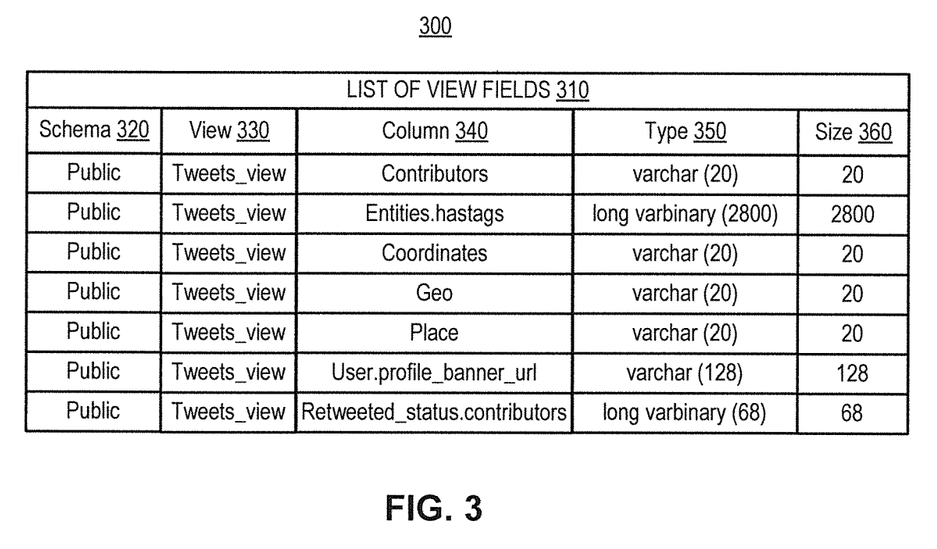
FIG. 3 shows a diagram of a list of view fields for a schematized flexible schema table, according to an example of the present disclosure.

With reference to FIG. 3, there is shown a diagram 300 of a list of view fields 310, according to an example of the present disclosure. It should be understood that the data depicted in FIG. 3 is for purposes of illustration only. In addition, the data depicted in FIG. 3 is used in various examples throughout the present disclosure to provide an understanding of the schematization of a flexible schema table.

As shown in FIG. 3, according to an example, the list of view fields 310 provides a listing of fields associated with a view called "Tweets_view" from a public schema. The list of view fields 310 may include metadata for a schema 320, a view 330, a column 340, a type 350, and a size 360. Tweets_view may be created by the view generator engine 118 from view columns that are selected by the key selection engine 116 from the keys in the keys table 210, as shown in FIG. 3.

In one example, the key selection engine 116 may select view columns from the keys in the keys table 210 based on a predetermined condition. The predetermined condition may be based on at least one of the frequency of occurrence for the keys in the flexible schema table, a usage of the keys in previous queries, a database schema constraint, a security policy, and a user annotation for the keys.

For example, the key selection engine 116 may select the most frequently occurring keys from the keys table 210 to be view columns. For example, the top K frequently occurring keys are selected whereby K is an integer greater than or equal to 1 and may be predetermined. Alternatively, the key selection engine 116 may select view columns based on whether the keys from the keys table 210 have been used in a previous query for a particular database tool or process. The key selection engine 116 may also select the view columns based on database schema constraints, such as a maximum column count or maximum row size.

According to another example, the key selection engine 116 may select view columns based on a security policy. The security policy may include or exclude a key from a resulting view definition if the key matches a specific pattern, such as a regular expression. Users or profiles may then be granted access to the resulting view according to an example. For instance, keys in the keys table 210 may be excluded from selection when they match a regular expression such as *.password.*. Further, a user may annotate the keys table 210 to control which keys from the keys table 210 are selected as view columns.

In one example, the view generator engine 118 may create a view of the flexible schema table from the selected view columns. The view created by the view generator engine 118 may include the view columns as virtual columns. That is, the view columns of the underlying flexible schema table are represented as virtual columns in the view created from the flexible schema table. Accordingly, the created view may result in an entity that appears to be a fixed schema table to database tools and processes.

For instance, as shown in FIG. 3, Tweets_view may be created by the view generator engine 118. Tweets_view includes view columns selected from the keys in the key table 210 based on a predetermined condition. Tweets_view also includes the estimated data type and size for each of the selected view columns. Thus, a database tool or process may query the metadata included in Tweets_view as if the underlying flexible schema table was a fixed schema table with a fixed set of columns of the appropriate types. According to an example, a SELECT * command from Tweets_view will return all relevant information from the flexible schema table.

Figure 4:
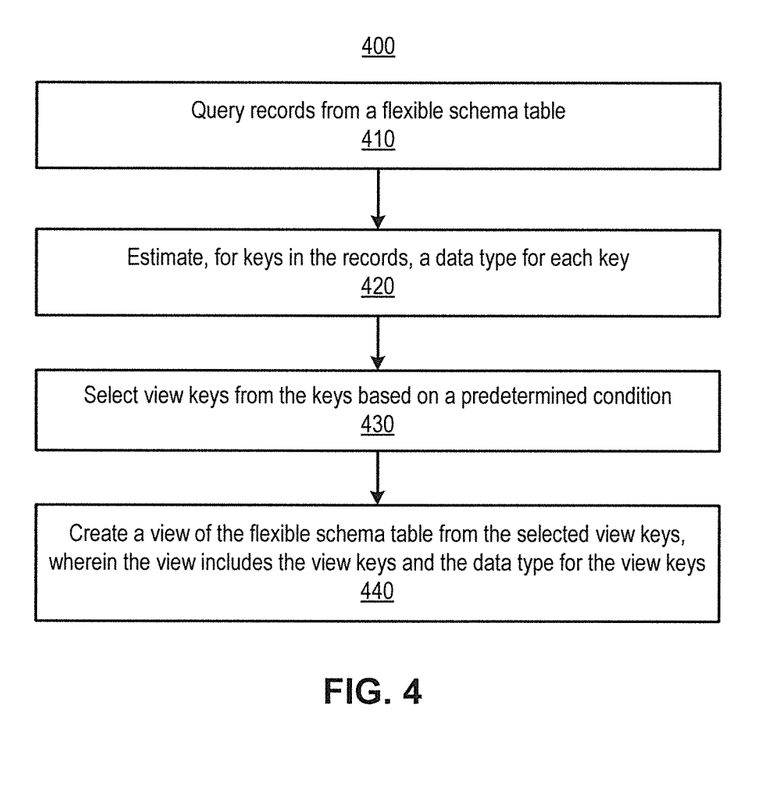
FIG. 4 shows a flow diagram of a method to schematize a flexible schema table, according to an example of the present disclosure.
Figure 5:
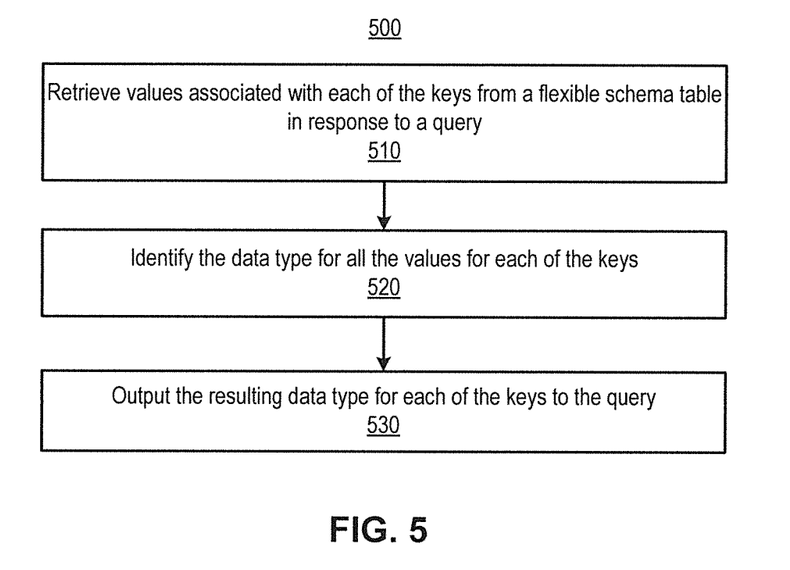
FIG. 5 shows a flow diagram of a method to estimate data types for keys in a flexible schema table, according to an example of the present disclosure.

FIGS. 4 and 5 respectively depict flow diagrams of methods 400 and 500 for schematizing a flexible schema table according to examples of the present disclosure. It should be apparent to those of ordinary skill in the art that the methods 400 and 500 represent generalized illustrations and that other operations may be added or existing operations may be removed, modified or rearranged without departing from the scopes of the methods 400 and 500.

With reference to FIG. 4, there is shown a flow diagram of a method 400 for schematizing a flexible schema table, according to an example of the present disclosure. The method 400 may be implemented, for instance, by the processor 102 of machine 100 as depicted in FIG. 1.

In FIG. 4, the query engine 112 may query records from a flexible schema table at block 410. The records in the flexible schema table may include a plurality of key-value pairs. Accordingly, the query may identify keys of the records, data values associated with each of the keys, and a frequency of occurrence for each of the keys in the flexible schema table.

According to an example, flexible schema tables with a nested structure may be flattened to identify the subfields for the keys during the query. Thus, the subfields may be identified as separate keys by the query engine 112 during the query operation instead of during the data loading operation.

After identifying the data values associated with each of the keys at block 410, the data type estimator engine 114 may estimate, for the keys in the records, a data type for each key, as shown in block 420 and as further discussed in method 500 in FIG. 5. The query engine 112 may output the identified key names (block 410), the estimated data type for each of the keys (block 420), and the frequency of occurrence for each of the keys in the flexible schema table (block 410) to the keys table 210.

As shown in FIG. 2 above, the keys table 210, for instance, may include fields for the key name 220, the frequency 230, and the data type estimate 240 identified in blocks 410 and 420. In addition to the key name, frequency, and data type estimation, the keys table 210 may include any other metric regarding the identified keys that may result from the query on the flexible schema table. Additionally, since the keys table 210 is persistent, a user may annotate the keys table 210 to control which of the keys are included in a view that is created for the flexible schema table as discussed below at blocks 430 and 440.

With reference back to FIG. 4, at block 430, the key selection engine 116 may select view columns from the keys based on a predetermined condition. For instance, the predetermined condition may be defined based on the frequency of occurrence for the keys in the flexible schema table, a usage of the keys in previous queries, a database schema constraint, a security policy, and the user annotation for the keys.

For example, the key selection engine 116 may select the most frequently occurring keys from the keys table 210 to be view columns. Alternatively, the key selection engine 116 may select view columns based on whether the keys from the keys table 210 have been used in a previous query for a particular database tool or process. The key selection engine 116 may also select the view columns based on database schema constraints, such as a maximum column count or maximum row size. According to another example, the key selection engine 116 may select view columns based on a security policy. For instance, keys in the keys table 210 may be excluded from selection when they match a regular expression such as *.password.*. Further, a user may annotate the keys table 210 to control which keys from the keys table 210 are selected as view columns.

At block 440, the view generator engine 118 may create a view of the flexible schema table from the selected view columns, wherein the view includes the view columns and the data types for the view columns. According to an example, the view generator engine 118 may define the selected view columns as virtual columns of the flexible schema table. That is, the view columns of the underlying flexible schema table are represented as virtual columns in the view created from the flexible schema table. Accordingly, the created view may result in an entity that appears to be a fixed schema table to database tools and processes.

Thus, a database tool or process may query the metadata in the view as if the underlying flexible schema table was a fixed schema table with a fixed set of columns of the appropriate types.

According to another example, the view generator engine 118 may convert the virtual columns into explicit columns for the underlying flexible schema table to enhance the performance of future queries on the flexible schema table. That is, the selected view columns may be defined as a real column for the underlying flexible schema table according to an example. Moreover, according to an example, multiple views of the flexible schema table may be created based on different predetermined conditions.

With reference to FIG. 5, there is shown a flow diagram of a method 500 for estimating a data type for each key in a flexible schema table, according to an example of the present disclosure. The method 500 may be implemented, for instance, by the processor 102 of machine 100 as depicted in FIG. 1.

As discussed at block 420 in FIG. 4, the data type estimator engine 114 may estimate a data type for each of the identified keys in the flexible schema table. The method 500 in FIG. 5 discusses the steps involved in estimating the data type for each of the identified keys in the flexible schema table in greater detail.

At block 510, the data type estimator engine 114 may retrieve values associated with each of key of the records from a flexible schema table in response to a query. For instance, the data type estimator engine 114 may retrieve all the values associated with all 144343 occurrences of the key "Geo" as shown in FIG. 2.

At block 520, the data type estimator engine 114 may run an aggregate function in the query to identify the data type for all the values for each of the keys. For example, the aggregate function may identify the most specific data type capable of describing all the values associated with each key of the flexible schema table.

Referring the example shown in FIG. 2, for instance, the aggregate function may determine that the retrieved values associated with the key Geo include both letters and numbers. Accordingly, the aggregate function may estimate that the data type should be a variable character field (varchar) that allows for both letter and number values. Further, the aggregate function may determine that the retrieved values associated with the key Geo are either 1 or 2 characters long. Accordingly, aggregate function may estimate that the data type size is a maximum of 2 characters.

At block 530, the data type estimator engine 114 may output the resulting data type and size for each of the keys to the query performed by the query engine 112. Thus, the data type estimate for all of the values associated with each identified key may be outputted to the keys table 210 under the data type estimate field 240 according to an example.

Thus, according to the disclosed examples, a flexible schema table may be schematized. Records from the flexible schema table may be queried and, for keys in the records, a data type is estimated for each key. View columns may then be selected from the keys based on a predetermined condition. Accordingly, a view of the flexible schema table may be created from the selected view columns, wherein the view includes the view columns and the data types for the view columns.

The schematization of a flexible schema table according to the disclosed examples enables other database tools and processes to take advantage of flexible schema tables without having to adapt their existing processes. For instance, an example of the present disclosure may automatically discover the metadata for the flexible schema table and create a view based on the discovered metadata, which may include the keys in the records and an estimated data type for each of the keys. Accordingly, a query may be performed on the view by a database tool or process without discerning whether the underlying table is defined by a flexible schema or fixed schema.

Moreover, the disclosed examples of the present disclosure may infer a fixed set of fields that is expected by the database tools or processes by selecting the appropriate view columns and including the appropriate view columns and their estimated data types as fields in a view created for the flexible schema table. By creating a view that has the appearance of a fixed schema table, the database tools and processes do not need to be changed to make use of the flexible schema table.

By using a schematization of flexible schema table a user may regenerate the view at any time and the existing load properties of the flexible schema tables are preserved. Additionally, the process can be repeated for different users where different table fields are important. In this manner, many entities can share a base flexible schema table, which simplifies deployment. The components of the required for the schematization of the present disclosure are readily available in databases, thus ensuring that integration of the flexible schema table with fixed schema tables is not overly complex.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for schematization of flexible schema tables, comprising: querying, by a processor, records in a flexible schema table to identify keys of a same name in the flexible schema table, wherein the records in the flexible schema table have a key-value format; determining, by the processor, a frequency of occurrence for each of the keys in the flexible schema table; placing, by the processor, the keys identified in the flexible schema table in a first column of a keys table and the frequency of occurrence for each of the keys in a second column of the keys table; estimating, by the processor, data types for the keys in the keys table, including retrieving values associated with each of the keys from the flexible schema table, and executing an aggregate function on the values associated with each of the keys to determine a data type that represents all of the values associated with each of the keys; placing, by the processor, the data types for the keys in a third column of the keys table; selecting view columns of the keys based on a predetermined condition related to the frequency of occurrence for each of the keys; and creating a view of the flexible schema table from the selected view columns, wherein the created view includes the selected view columns of the keys and the data types for the keys in the selected view columns.

2. The method of claim 1, comprising: inserting annotations for the keys in the keys table.

3. The method of claim 1, wherein selecting the view columns of the keys based on the predetermined condition comprises: defining the predetermined condition based on the frequency of occurrence for each of the keys in the flexible schema table and at least one of a usage of the keys in previous queries, a database schema constraint, and an annotation for one of the keys.

4. The method of claim 1, wherein selecting the view columns of the keys based on the predetermined condition comprises: defining the predetermined condition as a security policy, wherein, in the security policy, the keys that match a specific pattern are included or excluded from the view of the flexible schema table.

5. The method of claim 1, wherein the creating of the view of the flexible schema table comprises: defining the selected view columns as virtual columns.

6. The method of claim 5, further comprising: converting the virtual columns into explicit columns of the flexible schema table.

7. The method of claim 1, wherein the creating of the view of the flexible schema table from the selected view columns comprises creating multiple views of the flexible schema table based on different predetermined conditions.

8. A system for schematization of flexible schema tables, comprising: a processor; and a memory storing instructions that are executable to cause the processor to: query records in a flexible schema table to identify keys of a same name in the flexible schema table; determine a frequency of occurrence for each of the keys in the flexible schema table; place the keys identified in the flexible schema table in a first column of a keys table and the frequency of occurrence for each of the keys in a second column of the keys table; estimate data types for the keys in the keys table, including instructions to cause the processor to retrieve values associated with each of the keys, and execute an aggregate function on the values associated with each of the keys to determine a data type that represents all of the values associated with each of the keys; place the data types for the keys in a third column of the keys table; select view columns of the keys based on a predetermined condition related to the frequency of occurrence for each of the keys; and create a view of the flexible schema table from the selected view columns, wherein the created view includes the selected view columns of the keys and the data types for the keys in the selected view columns.

9. The system of claim 8, wherein the instructions are executable to cause the processor to define the predetermined condition based on the frequency of occurrence for each of the keys in the flexible schema table and at least one of a usage of the keys in previous queries, a database schema constraint, a security policy, and an annotation for one of the keys.

10. The system of claim 8, wherein the instructions are executable to cause the processor to define the selected view columns as virtual columns of the flexible schema table and to convert the virtual columns into explicit columns of the flexible schema table.

11. A non-transitory computer readable medium including machine readable instructions executable by a processor to:
query records in a flexible schema table to identify keys of a same name in the flexible schema table, wherein the records in the flexible schema table have a key-value format;
determine a frequency of occurrence for each of the keys in the flexible schema table;
place the keys identified in the flexible schema table in a first column of a keys table and the frequency of occurrence for each of the keys in a second column of the keys table;
estimate data types for the keys in the keys table, including causing the processor to retrieve values associated with each of the keys from the flexible schema table and execute an aggregate function on the values associated with each of the keys to identify a data type for each of the keys that represents all of the values associated with each of the keys;

place the data types for the keys in a third column of the keys table;

select view columns of the keys based on a predetermined condition related to the frequency of occurrence for each of the keys; and create a view of the flexible schema table from the selected view columns, wherein the created view includes the selected view columns of the keys and the data types for the keys in the selected view columns.

12. The non-transitory computer readable medium of claim 11, wherein, to select the view columns of the keys based on the predetermined condition, the machine readable instructions are executable by the processor to:

define the predetermined condition based on the frequency of occurrence for each of the keys in the keys table and at least one of a usage of the keys in previous queries, a database schema constraint, and an annotation for one of the keys.

13. The non-transitory computer readable medium of claim 11, wherein, to select the view columns of the keys based on the predetermined condition, the machine readable instructions are executable by the processor to:

define the predetermined condition as a security policy, wherein, in the security policy, the keys that match a specific pattern are included or excluded from the view of the flexible schema table.

14. The non-transitory computer readable medium of claim 11, wherein, to select the view columns of the keys based on the predetermined condition, the machine readable instructions are executable by the processor to:

select view columns of a subset of the keys in the keys table based on the frequency of occurrence of the subset of the keys being above a predetermined threshold.

15. The system of claim 8, wherein, to select the view columns of the keys based on the predetermined condition, the instructions are executable to cause the processor to: select view columns of a subset of the keys in the keys table based on the frequency of occurrence of the subset of the keys being above a predetermined threshold.

16. The method of claim 1, wherein selecting the view columns of the keys based on the predetermined condition comprises: selecting view columns of a subset of the keys in the keys table based on the frequency of occurrence of the subset of the keys being above a predetermined threshold.

* * * * *